(12) United States Patent
Tien

(10) Patent No.: US 6,938,029 B1
(45) Date of Patent: Aug. 30, 2005

(54) SYSTEM AND METHOD FOR INDEXING RECORDINGS OF OBSERVED AND ASSESSED PHENOMENA USING PRE-DEFINED MEASUREMENT ITEMS

(76) Inventor: Allan Y. Tien, 7921 Ruxway Rd., Baltimore, MD (US) 21204-3515

( * ) Notice: Subject to any disclaimer, the term of this patent is extended or adjusted under 35 U.S.C. 154(b) by 0 days.

(21) Appl. No.: 09/539,772

(22) Filed: Mar. 31, 2000

Related U.S. Application Data (60) Provisional application No. 60/127,194, filed on Mar. 31, 1999.

(51) Int. Cl.[7] .............................................. G06F 17/30
(52) U.S. Cl. ................... 707/1; 707/2; 707/6; 707/102; 707/104.1; 345/863; 348/157
(58) Field of Search ......................... 707/1, 102, 104.1, 707/500.1, 216; 348/157; 345/863

(56) References Cited

U.S. PATENT DOCUMENTS

| | | | | |
|---|---|---|---|---|
| 4,425,586 A | | 1/1984 | Miller ......................... 358/335 |
| 4,710,917 A | * | 12/1987 | Tompkins et al. ............ 370/62 |
| 4,841,387 A | * | 6/1989 | Rindfuss ..................... 360/72.1 |
| 4,924,387 A | | 5/1990 | Jeppesen .................... 364/409 |
| 5,172,281 A | * | 12/1992 | Ardis et al. ................. 360/72.2 |
| 5,218,672 A | | 6/1993 | Morgan et al. ............. 395/162 |
| 5,544,297 A | * | 8/1996 | Milne et al. ................. 395/154 |
| 5,657,077 A | * | 8/1997 | DeAngelis et al. .......... 348/157 |
| 5,893,053 A | * | 4/1999 | Trueblood ................... 702/187 |
| 5,949,952 A | * | 9/1999 | Bennett et al. ............... 386/46 |
| 6,230,121 B1 | * | 5/2001 | Weber ......................... 704/202 |
| 6,490,553 B2 | * | 12/2002 | Van Thong et al. ........ 704/211 |
| 6,510,427 B1 | * | 1/2003 | Bossemeyer et al. .......... 707/6 |

* cited by examiner

*Primary Examiner*—Charles Rones
*Assistant Examiner*—Jacques Veillard
(74) *Attorney, Agent, or Firm*—Lesley Coulson

(57) ABSTRACT

Pre-defined descriptor or measurement questions or items are presented to a user or operator using a computer with a storage and a display for use in systematic observation and assessment. Measurement items that are used in the course of observation and assessment are automatically correlated with address data that is associated with a track of simultaneous digital recording so as to automatically generate meaningful indexes for the recorded material. Based upon the contents of the measurement questions or items, including any qualitative or quantitative descriptions or numerical rating results from use of the descriptors or measurement items, the indexes can readily be further processed, providing the capacity for improvements in efficiency, consistency, and accuracy in retrieving and utilizing the recorded material. The method is particularly useful for processes relating to systematic interview or assessment methods, including the training and monitoring of interviewers or assessors and the storage, retrieval, analysis, and other manipulation of recordings.

39 Claims, 2 Drawing Sheets

SYSTEM AND METHOD FOR INDEXING RECORDINGS OF OBSERVED AND ASSESSED PHENOMENA USING PRE-DEFINED MEASUREMENT ITEMS

This application claims benefit of U.S. provisional patent application Ser. No. 60/127,194 on Mar. 31, 1999, the disclosure of which is herein incorporated by reference.

This invention was made with a grant from the U.S. government which may have rights to the invention.

FIELD OF THE INVENTION

The present invention generally relates to information processing systems. More particularly, the invention is a data capture and access system that correlates data with recorded signals with an index based on pre-identified identifiers at the time of capture but allows later annotation or additional indexing without affecting the original index identifiers or the recorded signals. The invention specifically provides a method for indexing of digital recordings of events by use of pre-entered or pre-existing measurement items that serve as index information designators such as key words or labels. Such a method is particularly useful as those used in a systematic interview or assessment method.

DESCRIPTION OF RELATED ART

Many events in the medical, legal, business and education domains, among others, today are being digitally recorded. Physicians may record a physical examination, operation, or autopsy and need to annotate that recording at some later time to notes, observations, or other content in order to make a more complete record or draw previously unseen trends. Lawyers may seek to record a witness deposition and later link that oral testimony to evidence (documentary, video, or testimony by other witnesses) in order to draw parallels or highlight inconsistencies The frequency of such recordings, audio, video, or other, is likely to increase as their usefulness continues to grow thereby allowing for review of the assessor's conclusion or diagnoses, providing an educational or teaching tool to illustrate optimum assessment interview techniques, documenting the interview for legal and/or other purposes. I Medicine and public health are domains in which considerable effort has been devoted to the development of assessment schedules and instruments for conducting assessment interviews. The objective of these efforts has often been to improve the reliability and efficiency of a clinician's diagnosis of his/her patient.

Among medical disciplines, psychiatry researchers have perhaps allocated the most efforts to developing patient assessment aids. Examples of the types of instruments developed include the Structured Clinical Interview for DSM (SCID), the Diagnostic Interview Schedule (DIS), the Composite International Diagnostic Interview (CIDI), the World Health Organization (WHO) International Personality Disorders Examination (IPDE), and the WHO Schedules for Clinical Assessment in Neuropsychiatry (SCAN). These tests have been standardized around a core set of inquiries or directions.

The response to standardized questions or directions is of interest for the assessor, both in terms of the substantive response as well as the behavior manifested in the delivery and of the response. Psychiatrists may want to measure behavioral responses, or observe the actions of psychiatrists in training. Cardiologists may want to measure physical responses to changes in. applied stress, such as the EKG readings during a cardiac stress test. Lawyers may seek to identify inconsistencies between witnesses to an accident using standardized questions. Similar examples are found in virtually every profession where a pattern of testing for response and analysis of the response is used.

However, anyone who has participated in reviewing these interview or testing records realizes that the review process needs help and improvement. If there was an efficient way to index the video, audio or other type of recording when the interview was recorded, much time could be saved when later searching the records for particular information.

It is, therefore, an object of the present invention to provide a system and method for conducting, recording, playing back and editing or annotating digital recordings in audio, video, or other format.

Key to any useful recording system based on digital media is the ability to efficiently generate meaningful indexes for the recorded material. Such indexes are well suited for structured information gathering events that use a systematic question-and-answer method containing a set or list of standardized inquiries, e.g., a list of television interview questions, a health questionnaire, a clinical or research medical assessment, a set of deposition questions, a list of actions to activate brain function in different ways, and a graded cardiac stress test, among others.

In the field of medicine and health, the established means of recording structured assessments has generally been by use of audio or video tape recorders. Indexing, if used at all, has been through length counters and manually added entries. This made the process tedious and often incomplete. In addition, the use of tape recorders means that the process of searching and playback is slow and inefficient.

In the field of digital recording, many indexing schemes have been developed, ranging from low-level encoding to linking of text with video frames. Industry standard digital encoding methods such as the MPEG-2 (Society of Motion Picture Engineers) format, include channels for indexing based upon time code. However, most of these approaches generate index entries in a form not directly useful for playback and management, but rather provide basic mechanisms for supporting indexing.

One system is known that uses computer voice-to-text processing to automatically generate words that are then used to index the digital audio recording. Although useful, it does not provide a more organized level of indexing, since many words will be used in many areas of a recording, and hence as such do not provide specific indexing to unique areas or segments of a recording For indexing to be more useful, the index items should contain meaningful and unique information that is associated with the recording location or segment. Any indexing method can support this, but it is tedious and inefficient to generate such index items manually.

Existing systems support some forms of indexing of recorded signals in a variety of ways. European patent application publication EP 0 495 612 by Lamming discloses a computer-based note-taking system integrated with an audio or video recording system. The computer presents a document editor style user interface to the user who either creates a new document or retrieves an existing document to which the user adds notes as a recording is made or played via the integrated audio or video system. As the user enters each note (mark or indicum), the indicum is added to the document and it is time stamped and stored in an information-to-time-stamp index. The time stamps are not visible to the user; they are stored with the computer's internal representation of the indica entered by the user. A video-frame time stamp function time stamps time code data received from the audio or video recorder and creates a time stamp-to-time-code index. A browser function permits the user to retrieve sections of the recording using the indicia directly by selecting the indicia The browser looks up the indicia in the first index to retrieve the time stamp, and looks up the time code of the recording in the second index using the time stamp, playing the section of the recording in the area indicated by the time code. EP 0495 612 also discloses how time stamping the indicia may be applied to creating topic or key word data. By entering new, separate indicia spatially near a previously entered indicia that is a key word or topic whenever an idea or speaker or topic applies to the previously entered indicia, later selection of all of the marks spatially associated with a topic will result in all sections of the recording indexed by the time stamps of the respective indicia to be replayed.

U.S. Pat. No 4,841,387, entitled "Arrangement for Recording and Indexing Information" and issued to Rindfuss, discloses a system for recording information relating to an event on a recording medium, such as an audio or video tape, and for indexing positions of handwritten notations made on a touch sensitive device and concerning the event to positions on the recording medium in order to allow the user to identify portions of the handwritten notations for which review of the correlated material on the recorded medium is desired. In the recording mode, the device makes an audio recording of the event on a standard cassette tape. Simultaneously, the electronic touchpad senses the position of the user's handwritten notes on the writing surface, and provides this information to the microprocessor which correlates the record of the positions of the handwritten notations on each page with the position of the recorded information on the audio tape at corresponding instants in time. Real-time constrained correlation vectors representing rectangular areas of the display surface each containing a cohesive group of handwritten text are each combined with a tape position that correlates to the instant in time the handwriting within that area began.

U.S. Pat No. 4,425,586 issued to Miller discloses a system that combines a video tape recorder with a computer in such a manner that these two components each automatically record and display where related information is stored in its own mechanism as well as in its counterpart mechanism, allowing the user to determine the location of all the corresponding data stored both on video tape and on a storage medium such as a diskette, by examining only one storage medium. Notes about the recorded event or document may be entered onto the diskette along with the automatic entry of the corresponding reel number and frame number of the video record and diskette and file address number of the computer storage medium. Another feature disclosed is the capability of the system to enter and display the time and date on both the video tape and diskette recording mediums as well as on both video monitors along with the data address location information.

U.S. Pat No. 4,924,387 issued to Jeppeson discloses a computerized court reporting system which provides for periodically annotating the stroke record made by the user of a court stenographic machine with a time stamp from a system clock while simultaneously sending a time stamp to a recording system making a video and audio recording of the testimony. The logic of a control system determines automatically when to time stamp the stroke record and permits the user to trigger a control function to annotate the video recording with automatic "on the record" and "off the record" messages with associated time stamps.

U.S. Pat. No. 5,564,005 issued to Weber et al. discloses a general system providing means for the user to first create a "time zone" correlated to a recording of an event, and then to flexibly enter into the time zone information relevant to the event, addressing some of the disadvantages of the systems described above.

These real-time data correlation and access systems have similar disadvantages. In the case of U.S. Pat. No. 5,564,005, the system does not automatically generate meaningful indica at the time the "time zones" are established by the actions of the user. Rather, information about the events correlated to a time zone is entered later, in the form of handwritten strokes, or may be generated and entered in real-time, subject to the conceptual and processing speed limitations and variance of a user's abilities. Therefore, the primary initial index guide to the meaning of the events within a time zone are the temporal characteristics of the time zone, augmented at the time by the memory of the user. In all these systems, no method or user interface design is explicitly suggested for handling the case of repetition or extension of certain events or activities in the recording, using a common indica for events or activities thereby related but occurring at different times, thereby facilitating or enhancing a user's personal note-taking style or accommodating the note-taking function to a variety of applications. For all except U.S. Pat. No. 5,564,005, the user's ability to index notes to the recording is entirely controlled through the indicia, or notes, the user has entered in a document, since the time stamps or position captures are those made at the time the notes are entered. Those systems assume, therefore, that the time of entry of a note sufficiently corresponds with the time or positions of the recording to provide an adequate index into the recording, requiring the user to mentally process the ongoing real-time events and within a certain time variance generate and enter the note. In the case of U.S. Pat No. 4,924,387, this provides an adequate indexing structure since the stroke record made is intended to be a verbatim transcription of the verbal testimony made in a courtroom. In the case of EP 0495 612, however, where a verbatim transcription of the event may not be the notetaker's intention, such an assumption does not allow for the later, real-time augmentation of previously entered notes, while still recording, with additional notes related to the previously entered notes, since the later notes will be time stamped with the time they were entered rather than with the time of the material to which they relate or are relevant. In the case of the system disclosed by Rindfuss, notes may be entered later, but the later-entered notes will be correlated with the position of the tape at the time the later they relate or are relevant. In the case of the system disclosed by Miller, notes addressed to the diskette record of the event at a later time are entered entirely during a post-processing phase and not during the real-time recording of the event. In some of these systems, neither time stamps nor tape positions are visible to the user and so the temporal or spatial context of the entered indicia is not available to the user to enhance the retrieval function. In addition, in EP 0 495 612 the function provided for creating topic or key words from the entered indicia may be practically limited to one display "page" or screen unless the user reenters the topic or key word on a second screen or scrolls between screens to add a mark to a previously entered topic or key word As with augmentation of notes in general, there is no facility for associating a key word or topic name created at a later time with notes entered earlier.

Existing post-processing (non-real-time) annotation systems in the field of post-production video editing provide for the creation of annotations about scenes correlated with "in" and "out" time codes identifying the scenes on a video recording. U.S. Pat No. 5,218,672 is an example of such a system. It is disclosed there that scene descriptions may be revised after initial creation, but the correlation of the annotations are confined temporally to the identified scenes.

In the post-processing system for the correlation of legal depositions with video recordings thereof disclosed in U.S. Pat. No. 5,172,281, a time code number is assigned by an operator of the system to both the computer transcript and the videotape segment where each question and answer passage begins, requiring manual time code entry. The location of individual words in the transcript may also be correlated with their corresponding position in the video recording, but there is no such result during the real-time process. In addition, the system does not appear to provide for the entry of notes or annotations.

Despite the number of such prior art methods, there exists a need for a recorded in formation system that will digitally record events and automatically generate informative indica that are correlated in real-time with the recording of the events without affecting an interviewer's ability to take notes or assess the flow of events. It would be desirable to have a system for annotating an indexed digital recording of information in such a manner that the annotation did not disrupt the standardization of the index or otherwise adversely affect the ability of one set of recorded information in a standardized index key to be compared to another set of recorded information having the same standardized index key.

There is also a need to generate a standard set of indexes that are not subject to individual variance and which can be used between and among recorded information pertaining to different individuals or events so that comparisons can be made. In the case of video and audio logging tools, exclusively post-processing systems are inadequate for generating notes and relationships between recorded segments, and are time consuming because they require review of the entire tape in order to generate an index. Automatic indexing of video and audio notes by system time stamping of key- or handwritten strokes or automatic detection of speaker voice changes does not provide adequate context markers for the recorded signals or does not permit user control of the amount of detail to be captured. For example, an index created on the basis of speaker segmentation of the material would tell who was speaking but not the substance of the talk. Establishing time zones through the action of a user does not directly generate indica containing information regarding the events within the time zones.

SUMMARY OF THE INVENTION

It is an object of the invention to provide a system and method for digitally recording information about an event or individual and generating a standard set of indexes for this information.

It is a further object of the invention to provide a system and method for annotating an indexed, digital recording of information without changing the standardized index markings in such a manner that would adversely affect the ability of one set of recorded information in a standardized index key to be compared to another set of recorded information having the same standardized index key.

In accordance with a preferred embodiment of the present invention, the invention employs a system that includes: (a) means for presenting a subject or operator with a measurement item; (b) a recorder that records and stores observations of events associated with the measurement item in a digital recording that includes a data track sequenced by a time track of time data; and (c) indexing software that enters an index mark based on said time data into an editable database denoting said measurement item. Any annotation, cross referencing, or entry of notes will occur in the database in association with the time data track index without affecting the index.

In use, the testing system of the invention includes the following steps; (a) presenting a measurement item to a subject or operator; (b) digitally recording on a digital storage medium at least one event associated with said measurement item, said digital recording having a event data track of event data sequenced by a time track of time data; (c) indexing said digital recording by entering time data related to said event into a field on computer database along with an identifier of said measurement item; and (d) optionally, augmenting said computer database by adding information to said database that relates to said event field without changing the relationship of said time data to said event data.

The system and method of the invention permit measurement items to be associated to observed events, the responses recorded and indexed by measurement items onto a computer-based database for review, annotation and augmentation of diverse information without affecting the time sequencing of the recorded data or the ability to replay a portion or all of the recorded events. Such a system will allow assessors and others using a "test and response" method of investigation much greater note-taking and annotation flexibility than was previously available with prior systems. The system of the invention also permits assessors to re-order recordings of events and compare similar events from different subjects on the basis of the associated measurement items in order to investigate possible relationships and/or trends not previously discernible.

DETAILED DESCRIPTION

The invention is described with reference to inquiries from an assessor and responses made by an interviewee during an oral interview. It will be understood that the description is equally applicable to any form of assessment or observation by verbal, visual, audio, or physical method (e.g., questions or directions whether presented orally or in printed form, physical tests or testing, etc.) and any form of response by the subject, human or other, of observation (verbal, nonverbal, or physical response) with mere changes in semantics to describe the particular form of test and response.

A testing system according to the invention includes the following steps: (a) presenting a measurement item to a subject or operator, (b) making a digital record on a digital storage medium at least one event associated with said measurement item, said digital record having an event track of event data sequenced by a time track of time data; (c) indexing said digital recording by entering time data an identifier relating to the measurement item into a fields on a computer database; and (d) optionally, augmenting said computer database by adding formation to said database that relates to said event field without changing the relationship of said time data to said event data.

An interviewing system according to the invention includes a personal computer having: (a) an output communication subsystem that allows communication with an interviewee or interviewer so that measurement items can be presented; (b) an input subsystem for the interviewee to respond to the measurement item communications; (c) a recording subsystem that makes a digital record of the output communications as well as the interviewee's responses with a data track of event data synchronized by a time track of time data; (d) a digital storage subsystem that allows the digital record to be stored for playback and editing; and (e) a computer with database software that can generate a database event index record based on said time data for each measurement item.

The means for presenting the subject or operator with measurement items can take many forms depending on the type of measurement item involved with the assessment The system and its method of use is most easily described in the context of an interview between a subject and an interviewer using a computer to display a series of questions to the interviewer as a guide for the interview. The interview is recorded by a recorder (preferably digital) that includes a data track synchronized by a time track of time data. As the interviewer moves from one question to another via input to the computer, the input is an act that causes the database to record the time data preferably a stop data bit for termination of the preceding segment and a start data bit for beginning the next segment) and an associated identifier that pertains to the new question (measurement item).

As those skilled in the art will appreciate, the indexing act can be done in an active interview situation, by the interviewer, as questions are posed. The indexing can also be done in passive situation, where the operator is observing but not necessarily actively interacting, by the operator entering an input into the computer from a list of predefined topic items (measurement items) during actions by the subject of observation. Either method will generate a database of event data that is indexed by a series of identifiers that can be sorted and retrieved for selective retrieval and playback of the events.

Preferably, the software for a personal computer that has the capability to: (i) communicate inquiries to the interviewee directly or through an interviewer in a systematic manner, (ii) provide a rating scale or method by which said inquiries can be rated, and (iii) provide an index in the form of retrievable, index marks associated with the inquiries. A personal computer is used to communicate the inquiries and then to capture and digitally record or control a recording device that records the interviewee's responses to form a digital record of indexed responses.

During later playback and if responses are to be further indexed, the system can also insert additional response index marks and the identifiers for them into the digital record so that responses are digitally marked for retrieval. An assessor may also insert additional inquiry index marks into the recorded interview. Index marks can be placed at any point in the recording but an inquiry index mark is preferably inserted where a specified data item inquiry is being communicated, and a response index mark is inserted where the response is made. The inquiry and response index marks are desirably standardized and relate to the content of the inquiry or the response.

The invention is conveniently explained in the context of an interview under the WHO Schedules for Clinical Assessment in Neuropsychiatry (SCAN). These schedules represent a detailed instrument for clinically-based, standardized psychiatric assessment of psychopathology. The SCAN is a widely recognized and used international standard. It will be understood by those skilled in the art that the techniques applied to a SCAN assessment would be applicable to other types of assessment instruments, physical examinations, or other physical phenomenon whose analysis is aided with a recording of sights, sounds, and/or other domains of observation with only minor semantic differences that describe the same essential types of events.

During an assessment interview with a human subject, real-time selection of the relevant item in the natural course of the events automatically generates a series of time-stamped inquiry index marks that serve as an informative indicum for the recorded data The time-stamp index marks time stamp plus identifier) are stored in database fields with time data that is correlated to a sequence of event data in the recording of the events. The resultant set of time stamp index marks then provides a general index structure which can be used to further support, independently of the re-time process, a flexible note-taking structure and user interface that complements diverse personal note-taking styles and application needs.

Notations and annotations in the form of text, sound, video, or other data can be entered into the database as separate fields of information without affecting the relationship between the time stamp index mark and the recorded data associated therewith. Thus, the use of digital index marks of an event recording in an editable database provides assessors with the ability to generate assessment records rich in diverse content. When coupled with standardized assessment inquiries (e.g., a list of standard interview questions) and a database field that identifies each inquiry by a standardized descriptor for each inquiry, this rich assessment record can be used as a basis for comprehensive comparisons on a rich, diverse content.

In the case of assessment interviews in which there is no pre-existing set of measurement items (questions, definitions, inquiries, instructions, directions, or other tasks), an important feature of the present invention is the ability for the assessor or another individual (an interview designer) to generate a set of items prior to the event to be recorded and develop a new set of inquiries for investigating new issues. This set of items can be used and reused as real-time index information designators which can later be used as standard access mechanisms into both the notes and the correlated recorded signals. These new inquiries, e.g., key words, labels, or any other pointer to information, can identify specific concepts in the user-produced information for which the user wants to have later access. An information designator is treated as an object that is easily created and reused and this novel implementation both in the user interface and data structure or the present invention provides a flexible and powerful indexing tool into the recorded signals in addition to the access provided by the recorded medium's address parameter.

In an environment where a recording of events is being made simultaneously, the interviewer has limitations on what actions can be taken or additional items considered as the interview is in progress. The present invention produces a digital database of indexed inquiries and responses that can be used to organize the assessor's notes originally written in free text or graphical form but later entered into the database with minimal restriction as to the amount of that information or when it is entered. The inquiry and/or response index marks allow the assessor's notes to be correlated with the recorded signals of the event. Further, the present invention provides the assessor with the ability to modify any notes that were previously entered without regard to when the modifications are made or where they are located on the recording medium.

The invention recognizes, moreover, that the temporal or spatial sequencing of information is itself often a significant clue to the content of the information and may aid a user in recalling memories or in retrieving recorded information from a perceived event. The inquiry and response index marks of the present invention provide a mechanism for the user to control the playback sequence and thereby view the index with items sorted in, e.g., chronological order, type of inquiry (as denoted by the type of inquiry index encoded into the digital record), by type of response (also as denoted by the type of response index mark encoded into the digital record), as well as any other order desired by the assessor.

The system of the present invention is particularly effective for video and audio interviews where the events include a time sequence of responses by the test subject. These events are recorded as a series of audio or video input data sequenced by a time track of time data. Because the amount of detail that may be captured for a particular time on an associated recorded medium is open-ended, a richer set of annotations may be made while the video is being digitally recorded in real time than is typically allowed in previous analog systems. The time zone and reusable information designator object features provide for treating the event as a whole by permitting later augmentation or modification of previously made notes. This relieves the note-taker of many of the pressures typically associated with taking interview notes in real time.

It is another significant advantage that the system of the present invention operates in both real-time and post-processing environments. This feature recognizes that note-taking as a human activity is typically an interactive process. The output data structure (e.g., the video log), produced by the system of the present invention during a real-time note-taking session while the event is being recorded may be further modified and/or augmented by the same user or by different users during post-processing review sessions occurring in parallel or seriatim. This facilitates and potentially reduces the time involved in the post-processing session.

A system for correlating event data being recorded in real time to event information entered into the system by a system user includes input circuitry connected to a user input device for producing signals indicating actions of a system user, output circuitry connected to a display having area for presenting images; and a processor connected for receiving the signals from the input circuitry, and connected for providing images to the output circuitry. The system also includes a digital recording device in communication with a digital storage medium for producing a plurality of signals indicating recorded event data about an event for storage on the storage medium. The recording device is currently producing the plurality of signals and indicating the recorded event data and is connected for simultaneously providing address data items to the processor of the system and to the recording device. The recording device stores the plurality of signals indicating the recorded event data on the storage medium so that a recording address value of each address data item provided by the address source indicates a portion of the recorded event data The systems also includes memory for storing data including instruction data indicating instructions the processor executes.

Stated another way, the system may be configured to operate in a post-processing environment so that an event that has already been recorded but not indexed is the event about which a log is constructed according to the present invention. The event that has already been recorded is digitally stored on a storage medium as a plurality of signals indicating recorded event data about the event. In this aspect of the invention, the system includes an output device for presenting the previously recorded signals thereon to the system user. This output device is in communication with the storage medium including the plurality of signals indicating recorded event data about the event. The output device is connected for providing a plurality of address data items to the processor of the system as user-requested address values; each address data item is a recording address value indicating a portion of the recorded event data. Preferably, the plurality of signals indicating the recorded event data includes the plurality of address data items, but the output device may itself generate them as the plurality of signals is being presented by the output device.

The system of the present invention permits a system user to interactively produce stored information that is correlated with an "address". The "address" refers to a measurement dimension used to identify a portion of the stored information. When the stored information is being correlated with recorded signals, the address typically refers to the location of the recorded signals on the storage medium storing the recorded signals. However, the system of the present information is not limited to correlating information with recorded signals, and may be used in any situation where later access to the stored information would be facilitated by correlation with an address, and by having an access mechanism as provided by the "information designators". Generally, when the system user is producing a database of stored information, the address record will be time data taken from the time track of the recording of the events.

The computer-controlled system of the present invention uses common, readily available hardware components. For an assessment interview delivered via computer, the system includes a computer with an image display that will display questions or directions, an input that receives signals from a user interaction device, e.g., keyboard, digital tablet, microphone, camera or other recording device that produces a data track synchronized by a time track. The display can present the questions directly to the subject or, alternatively, can display a series of questions to an interviewer/assessor who then presents the questions to the subject. Some act taken to move from one question to another generates the database time entry or start/stop time entries as well as the index identifier that pertains to the question.

Analog recording devices can be digitized or recorded directly as a digital recording that includes: (a) a data track of sound, image, or other event data that are synchronized by (b) a time track that includes time data correlated with event data. The use and existence of these two data tracks is typically transparent to the user of the equipment but can be read by a computer and used to generate database entries for each recorded event based on the time track data associated therewith from the digital recording.

The user interaction devices useful in the present invention may include any one of a variety of input devices controllable by a human user. For example, the user interaction device may include a pointing and gesturing device to indicate actions, gestures, and strokes such as those produced when making handwriting gestures. A stylus or other form of handheld pen are examples of a suitable user interaction device. Other pointing devices such as a mouse or a trackball may also be suitable for indicating actions, gestures, and strokes.

Figure 1:
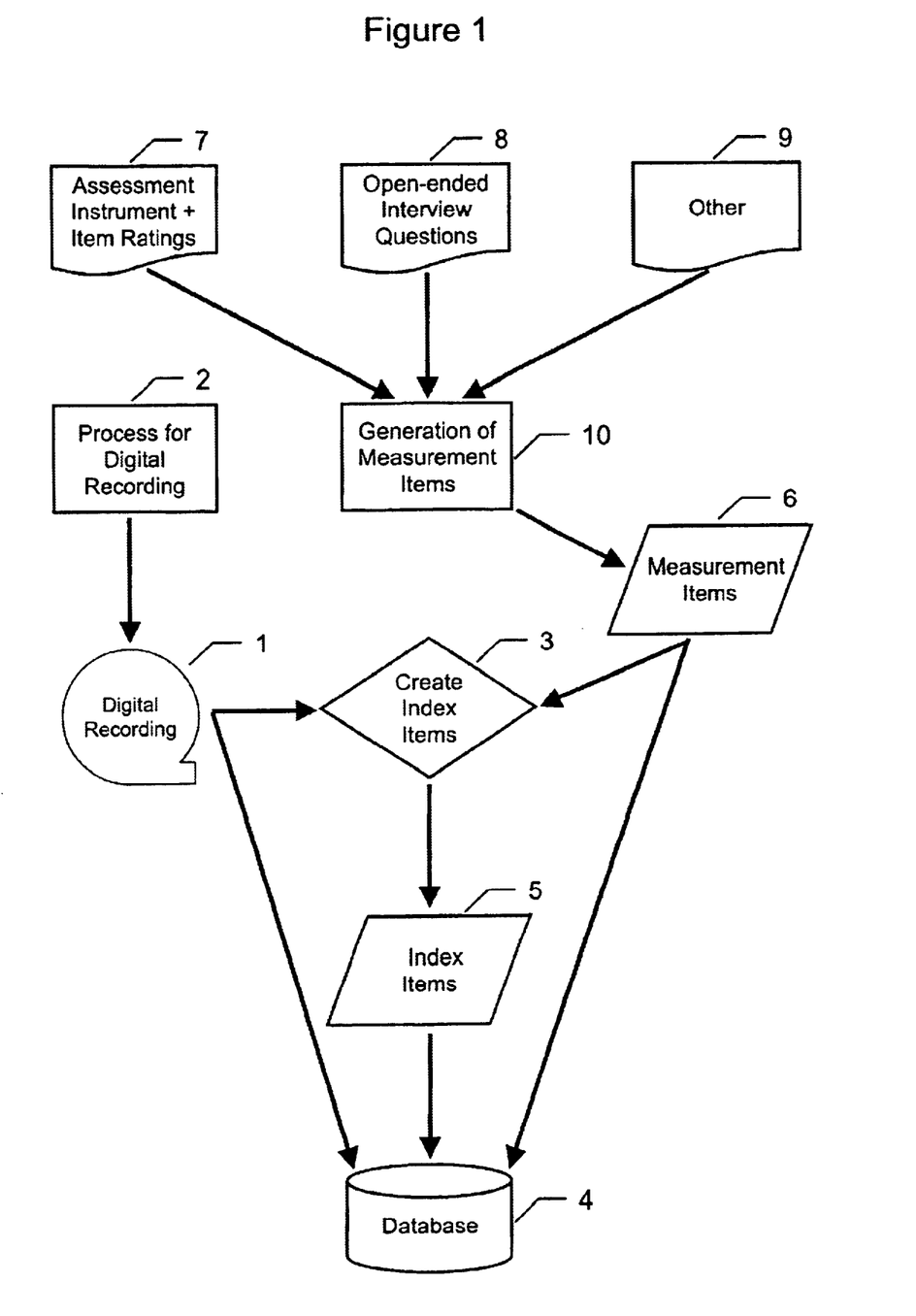
FIG. 1 is a flow diagram of the recording and indexing functions of the present invention.

The present invention is further understood by reference to FIG. 1 which shows a flow diagram of the recording and indexing functions of the present invention. A digital recording 1 of a series of events is made directly by a digital recorder or made into a digital formation 2 from an analog recording. The indexing system 3 is used to generate a database 4 of index items 5 based on measurement items 6.

Suitable measurement items can vary over a wide range and will depend on the information sought from the test subject and the type of analysis intended. Examples of analysis include behavorial responses to audio and/or visual information (questions, directions, lights, sounds, etc.), physical examinations of laboratory specimens, oral depositions of witnesses, etc. In the case of a behavioral examination, measurement items 6 can be generated in process 10 from a standard assessment instrument 7, open ended questions 8. and any other inputs 9 desired by the assessor. Preferably, process 10 is a simple system that is readily repeated. Suitable examples include. a question outline or list.

Figure 2:
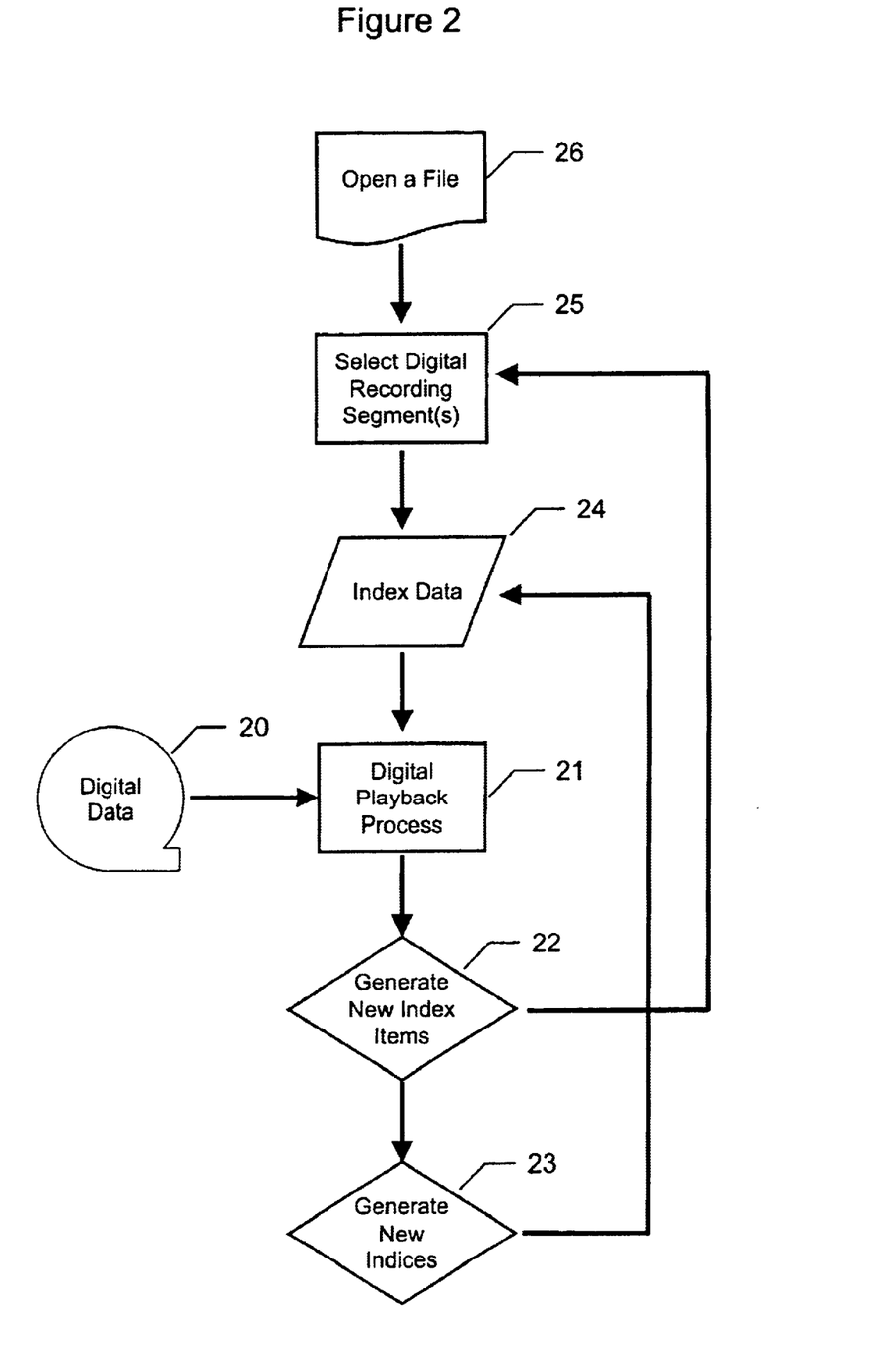
FIG. 2 is a flow diagram of the playback and editing functions of the present invention.

Similarly, FIG. 2 shows a flow diagram of the playback and editing functions of the present invention. Digital data 20 made of an event sequence track of event data is synchronized by an associated time track of time data is played back 21 for audio, video, and/or physiological events. Preferably, new index items 22 are created during a post-processing playback and review phase but may also be created separately, for example as a pre existing detailed set of measurement sub-items, or as additional notes during the original assessment process. Each index items is based on a link 23 between the time data in the time track with corresponding event sequence data and entered as index data 24 in a database. This database can include associated records that identify the index entries by a common set of labels, index attributes 25 or other identifier that allow diverse event data from different subjects under a common framework. The resulting assessment forms a database file 26 that can be stored, shared, or integrated into other digital records as needed by the assessor.

Although the foregoing disclosure relates to preferred embodiments of the invention, it is understood that these details have been given for the purposes of clarification only. Various changes and modifications of the invention will be apparent, to one having ordinary skill in the art, without departing from the spirit and scope of the invention.

What is claimed is:

1. An assessment system comprising:
  a. a set of related predefined measurement items used to structure observation and assessment of observable events or phenomena, said set of related predefined measurement items being selected from the group consisting of a questionnaire, examination plan, interview schedule, report form, set of directions or established survey;
  b. means for presenting a subject or operator with at least one item from said set of measurement items;
  c. means for recording at least one observable event or phenomenon with said presentation of at least one measurement item and storing the recorded at least one observable event or phenomenon as a track of event data sequenced by a track of address data; and
  d. for each presented measurement item, means for associating the at least one presented measurement item to at least one portion of the event data in an index database that includes at least one field denoting the presented measurement item and at least one field denoting address data for the at least one portion of the event data associated with the presented measurement item.

2. An assessment system according to claim 1 wherein said means for presenting a subject or operator with at least one measurement item includes a computer having a central processing unit, a storage system, and an output display.

3. An assessment system according to claim 2 wherein said output display is selected from the group consisting of a projection display, a computer display, and a video display.

4. An assessment system according to claim 1 wherein said means for presenting a subject or operator with at least one measurement item includes at least one of a video display, a computer display or a video player.

5. An assessment system according to claim 1 wherein said means for recording includes a digital recorder.

6. An assessment system according to claim 1 wherein said means for recording includes an analog recorder that produces an analog recording which is then digitized.

7. The assessment system of claim 1 wherein said set of related predefined measurement items includes a pre-existing set of predefined measurement items used independently of said assessment system to observe and assess events or phenomena.

8. The assessment system of claim 1 wherein said means for associating the at least one presented measurement item to at least one portion of the event data includes means for associating each predefined measurement item in the set of predefined measurement items to at least one portion of the event data.

9. The assessment system of claim 1, additionally comprising means for creating and storing said at least one predefined measurement item before said means for presenting said measurement item presents said at least one measurement item to a subject or operator.

10. The assessment system of claim 9, wherein said at least one predefined measurement item is a deposition question, and said means for creating and storing said measurement item creates and stores a set of deposition questions.

11. The assessment system of claim 1, additionally comprising means for accepting input from the operator or subject, said input indicating that the operator or subject is ready for presentation of another measurement item.

12. The assessment system of claim 11, wherein said means for accepting input is selected from the group consisting of computer mouse, stylus, keyboard, digital tablet, microphone, touch screen, gaze tracking device, brain electromagnetic activity tracking system, and video sensor.

13. The assessment system of claim 1, wherein said track of address data comprises a track of time data, and said at least one field denoting address data comprises time track data.

14. The assessment system of claim 1, additionally comprising means for augmenting said index database by adding information relating to said at least one portion of the event data to said database without changing the association of said at least one presented measurement item with said at least one portion of the event data.

15. The assessment system of claim 1 wherein said at least one predefined measurement item additionally comprises a rating scale.

16. An assessment system comprising:
  a. at least one predefined measurement item used to structure assessment observable events or phenomena, said at least one predefined measurement item selected from a set of related predefined measurement items, said set of related predefined measurement items being selected from the group consisting of a questionnaire, examination plan, interview schedule, report form, set of directions or established survey;

b. stored event data of at least one recorded observable event, said at least one observable event occurring simultaneously with a presentation of at least one predefined measurement item, said stored event data being sequenced by a track of address data; and c. an index database including a field indicative of a measurement item and a field indicative of an address in the stored event data for a portion of the stored event data associated with the presented measurement item;

wherein an operator reviewing the at least one recorded observable event in the stored event data can create or update an entry in the index database for a measurement item.

17. The assessment system of claim 16, wherein an operator reviewing the stored event data can update the index database without removing existing index entries associating a predefined measurement item with a portion of the stored event data from the index database.

18. The assessment system of claim 16, wherein said track of address data comprises time track data, and the field indicative of the address in the stored event data contains time track data.

19. A method for systematically assessing observable events or phenomena, comprising:

a presenting a predefined measurement item from a set of related predefined measurement items to a subject or operator, wherein said set of predefined measurement items are used to structure the observation and assessment of observable events or phenomena, said set of related predefined measurement items being selected from the group consisting of a questionnaire, examination plan, interview schedule, report form, set of directions or established survey;

b. making a record of at least one observable event or phenomenon associated with said presented measurement item, said record having a track of event data sequenced by a track of address data; and c. generating an index entry in a database linking the presented measurement item to a portion of the event data record, wherein said index entry comprises a measurement item identifier field indicative of said presented measurement item, and a field containing address data indicative of an address for the portion of the event data record.

20. The method according to claim 19 wherein the step of presenting a predefined measurement item to a subject or operator comprises presenting a predefined measurement item on a computer display, a video display or a video player.

21. The method according to claim 19 wherein the step of presenting a predefined measurement item to a subject comprises displaying the measurement item to an operator, and the operator presenting the measurement item to the subject.

22. The method of claim 21, wherein the step of presenting a predefined measurement item to a subject further comprises displaying the measurement item to an operator, the operator presenting the measurement item to a subject in an interview, and the operator interacting with the subject in accordance with said measurement item.

23. The method according to claim 19 wherein the step of presenting a predefined measurement item to an operator or subject comprises displaying an image on a video display, a computer display or projection.

24. The method according to claim 19 wherein said record is a digital recording.

25. The method according to claim 19 further comprising:

augmenting said database by adding information relating to said at least one observable event or phenomenon to said database without changing the relationship of said address data to said event data.

26. The method according to claim 19 wherein the step of generating an index entry comprises automatically generating an index entry for each measurement item as the subject or operator proceeds from one measurement item to another.

27. The method of claim 19, additionally comprising the step of:

accepting input from the operator or subject indicating that the operator or subject is ready for presentation of another measurement item from the set of related predefined measurement items;

wherein said step of generating an index entry in a database linking the measurement item to a portion of the record of event data automatically occurs upon said input from said operator or subject.

28. The method of claim 19, further comprising the step of appending address data for a portion of the event data to an existing index entry when the operator or subject returns to a predefined measurement item in the course of assessing the at least one observable event.

29. The method of claim 19, wherein the track of address data comprises a track of time track data, and the field containing address data indicative of an address for the portion of the event data record includes time track data.

30. The method of claim 19 wherein said set of related predefined measurement items comprises a preexisting set of predefined measurement items used independently of said method to observe and assess events or phenomena.

31. The method of claim 19, wherein said step of generating an index entry in a database comprises generating an index entry for each measurement item in the set of related predefined measurement items.

32. The method of claim 19, additionally comprising the step of creating and storing said at least one predefined measurement item before said step of presenting said a predefined measurement item to a subject or operator.

33. The method of claim 19, additionally comprising the step of playing back the record after the completion of at least one observable event or phenomenon, wherein said index entries are used to control the playback sequence.

34. The method of claim 33, wherein said index entry additionally includes a field indicative of a type of measurement item and a field indicative of a type of response to a measurement item, and playback sequence is sorted by chronological order, type of measurement item, or type of response to presentation of a measurement item.

35. A computer-readable medium containing instructions that cause a computer to index a recording of at least one observable event in an assessment system, said medium comprising:

a storage section for storing a digital recording of the at least one observable event, said digital recording having a track of event data sequenced by a track of address data;

a first code section containing instructions that cause the computer to present at least one predefined measurement item selected from a set of related predefined measurement items to a subject or operator, said set of related predefined measurement items being used to structure the observation and assessment of observable events or phenomena, and said set of related predefined measurement items being selected from the group consisting of a questionnaire, examination plan, interview schedule, report form, set of directions or established survey; and a second code section containing instructions that cause the computer to automatically generate an index entry in a database linking the presented measurement item to at least one portion of the at least one stored observable event; wherein said index entry comprises a measurement item identifier field indicative of said presented measurement item, and an address field indicative of an address for the at least one portion of the at least one observable event stored in the track of event data.

36. The computer-readable medium of claim 35, wherein said set of related predefined measurement items being used independently of said assessment system to observe and assess events or phenomena.

37. The computer-readable medium of claim 35 additionally comprising a fourth code section containing instructions that cause the computer to accept input from the operator or subject, and define the at least one predefined measurement item according to the input.

38. The computer-readable medium of claim 35 wherein the first code section contains instructions that cause the computer to present at least two predefined measurement items to a subject or operator, and wherein said second code section contains instructions that cause the computer to automatically generate index entries in the database for each measurement item, each entry linking the respective measurement item to at least one portion of the stored at least one observable event.

39. The computer-readable medium of claim 35, additionally comprising a sixth code section containing instructions that cause the computer to digitally record the at least one observable event, and store the digital recording in said storage section.

* * * * *